US011155129B2

(12) United States Patent
Polster

(10) Patent No.: US 11,155,129 B2
(45) Date of Patent: Oct. 26, 2021

(54) WHEEL CLAMP ASSEMBLY FOR SEMI-AUTONOMOUS TIRE CHANGER MACHINE

(71) Applicant: Hunter Engineering Company, Bridgeton, MO (US)

(72) Inventor: Charles Polster, Edwardsville, IL (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 359 days.

(21) Appl. No.: 16/298,424

(22) Filed: Mar. 11, 2019

(65) Prior Publication Data
US 2019/0291519 A1 Sep. 26, 2019

Related U.S. Application Data

(60) Provisional application No. 62/645,857, filed on Mar. 21, 2018.

(51) Int. Cl.
*B60C 25/05* (2006.01)
*B60C 25/132* (2006.01)

(52) U.S. Cl.
CPC ...... *B60C 25/0521* (2013.01); *B60C 25/0515* (2013.01); *B60C 25/0539* (2013.01); *B60C 25/0578* (2013.01); *B60C 25/132* (2013.01)

(58) Field of Classification Search
CPC ......... B60C 25/02; B60C 25/04; B60C 25/05; B60C 25/0506; B60C 25/0584; B60C 25/0521; B60C 25/0515; B60C 25/0539; B60C 25/0578; B60C 25/125; B60C 25/13; B60C 25/132; B60C 25/138
See application file for complete search history.

(56) References Cited

U.S. PATENT DOCUMENTS

| | | | | |
|---|---|---|---|---|
| 2,712,350 A | * | 7/1955 | Henderson | B60C 25/04 157/1.22 |
| 4,324,282 A | * | 4/1982 | Leeper | B60C 25/132 157/1.22 |
| 4,403,640 A | * | 9/1983 | Schifferly | B60C 25/04 157/1.3 |
| 6,408,921 B1 | * | 6/2002 | Bonacini | B60C 25/132 157/1.24 |
| 8,307,874 B1 | * | 11/2012 | Hanneken | B60C 25/0536 157/19 |
| 8,387,675 B1 | | 3/2013 | Vaninger et al. | |
| 8,613,303 B1 | | 12/2013 | Hanneken et al. | |
| 8,770,254 B1 | | 7/2014 | Hanneken et al. | |
| 8,973,640 B1 | * | 3/2015 | Hanneken | B60C 25/138 157/1.17 |
| 9,434,219 B1 | | 9/2016 | Clasquin et al. | |
| 2014/0034249 A1 | * | 2/2014 | Sotgiu | B60C 25/0545 157/20 |

* cited by examiner

*Primary Examiner* — Robert J Scruggs
(74) *Attorney, Agent, or Firm* — Sandberg Phoenix & von Gontard, P.C.

(57) ABSTRACT

A tire changer machine, and method of operation, configured with a tire-engaging wheel clamp assembly to secure a wheel assembly consisting of a wheel rim and tire mounted thereon to a drive assembly, and for demounting of the tire from the wheel rim. Upon dismounting of the tire from the wheel rim, a recessed surface and annular flange of the tire-engaging wheel clamp assembly is configured to catch and retain a rim or bead of the demounted tire, restricting movement of the tire upon dismounting from the wheel rim, until retrieved by an operator.

11 Claims, 11 Drawing Sheets

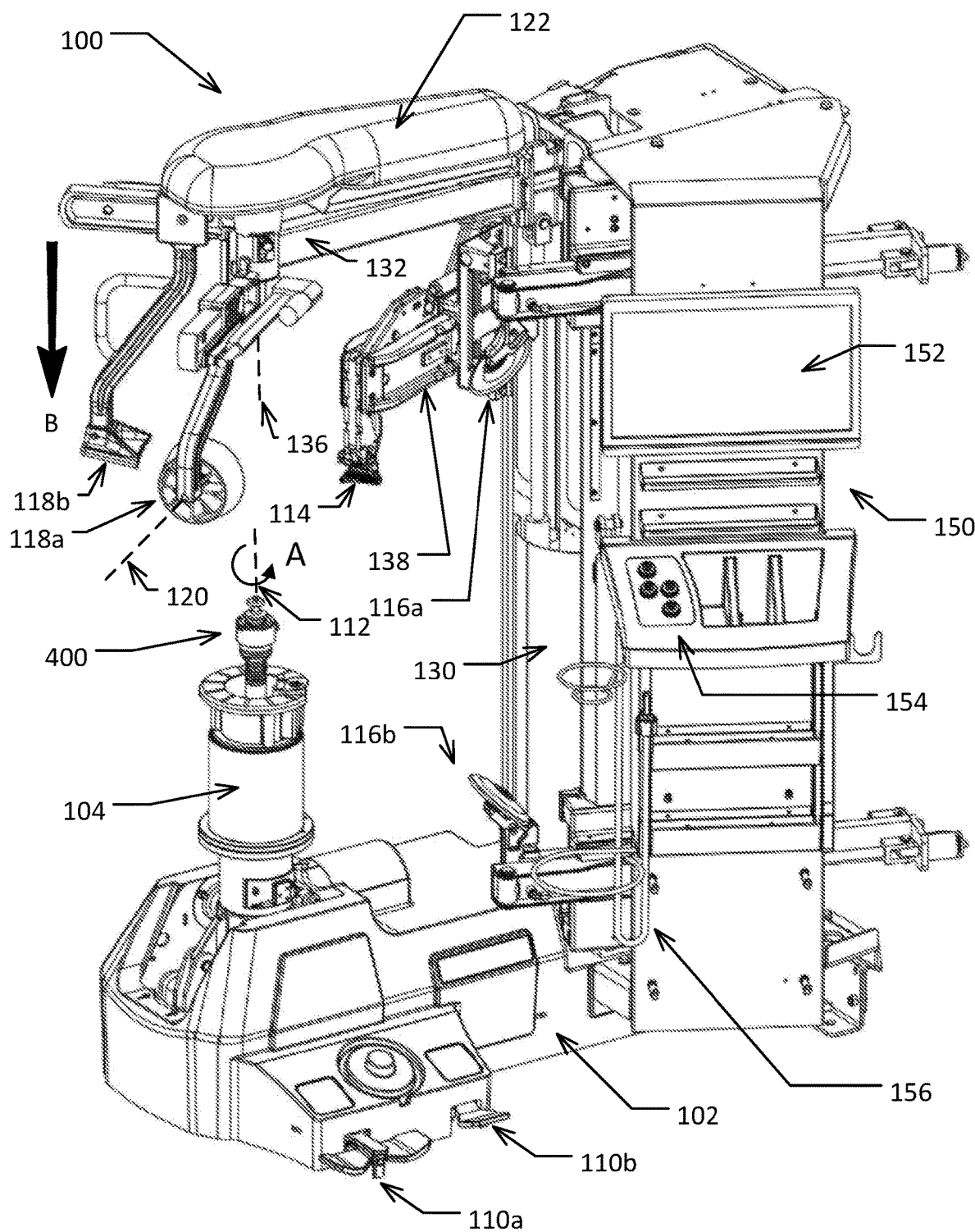
FIGURE 1 – PRIOR ART

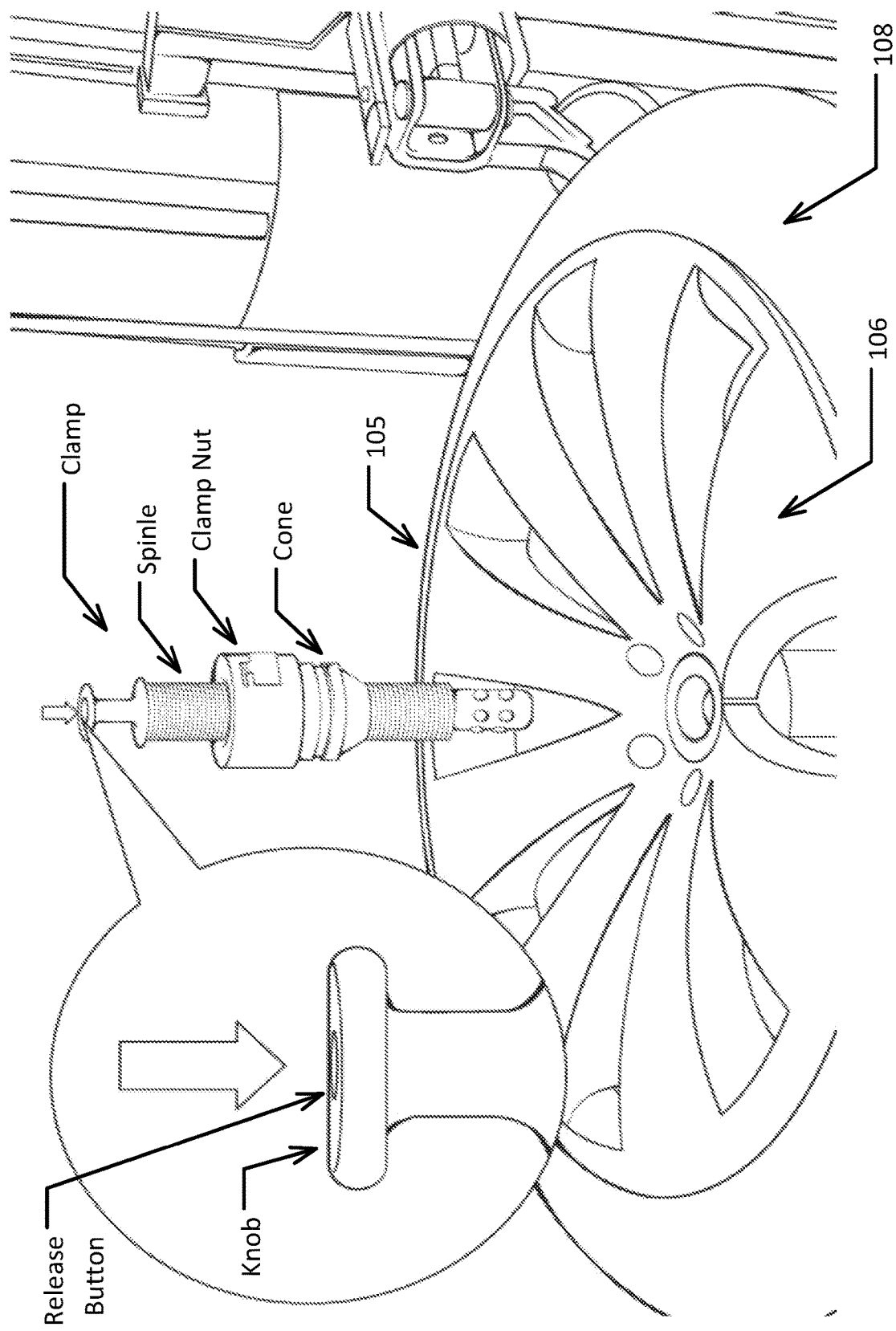

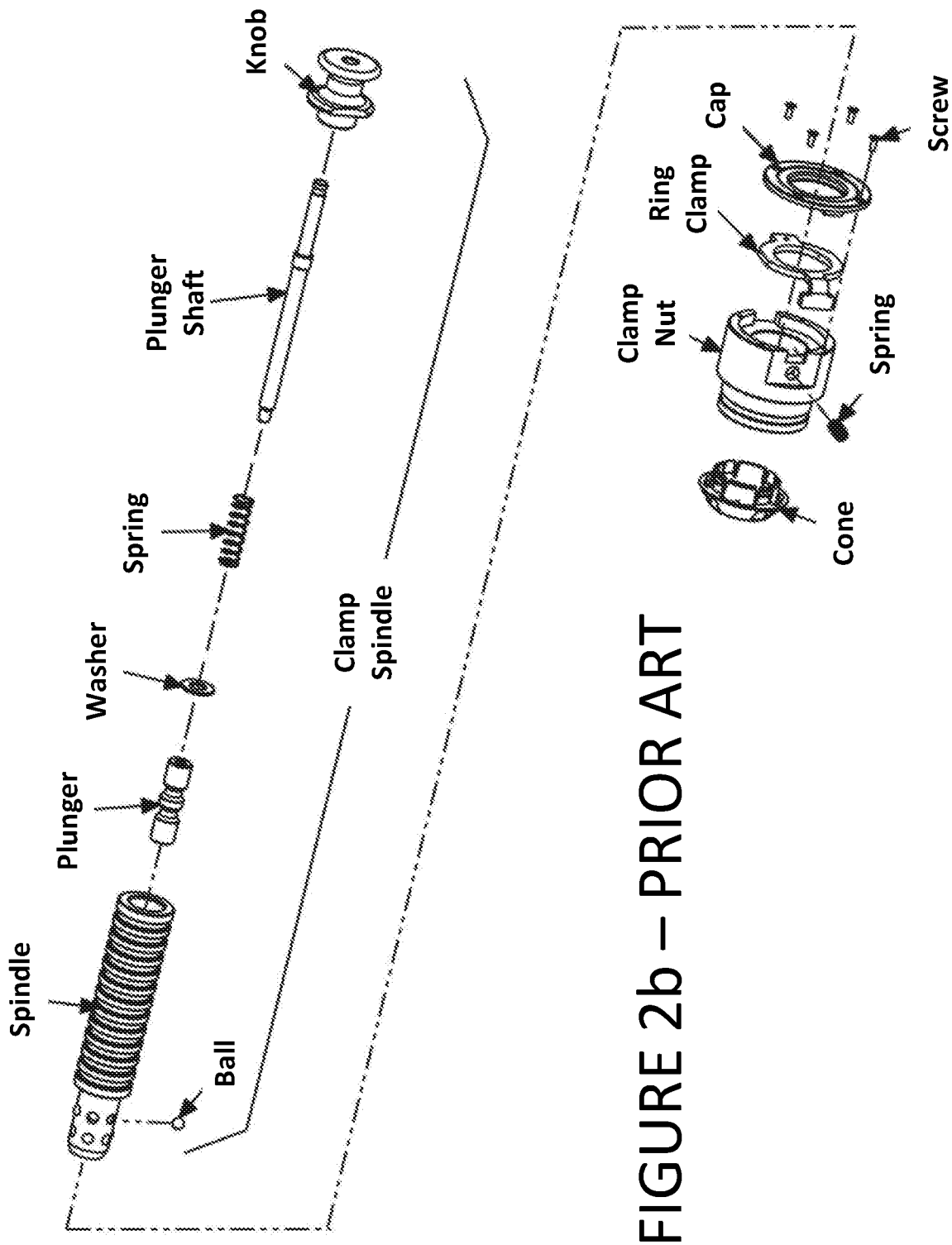
FIGURE 2b – PRIOR ART

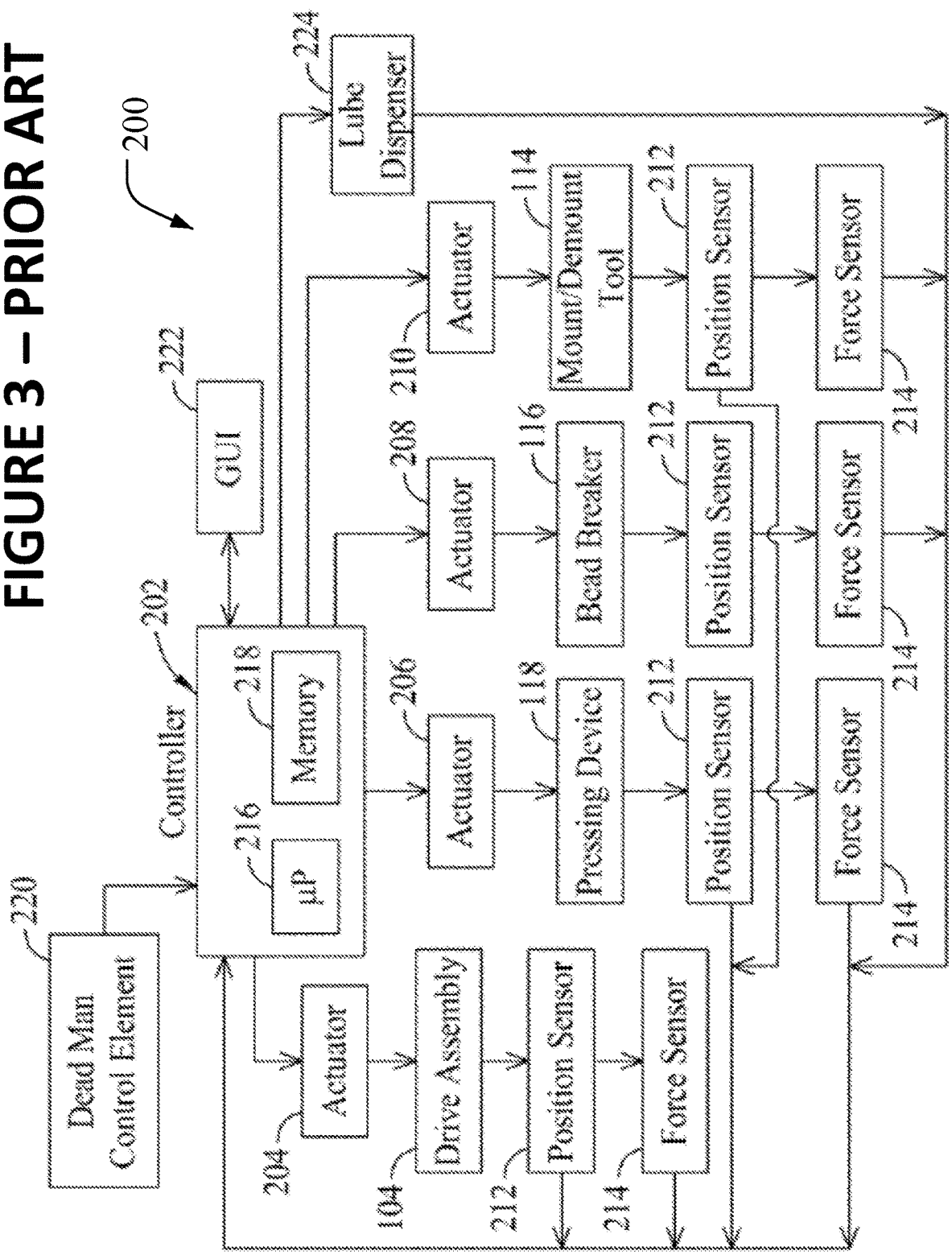
FIGURE 3 – PRIOR ART

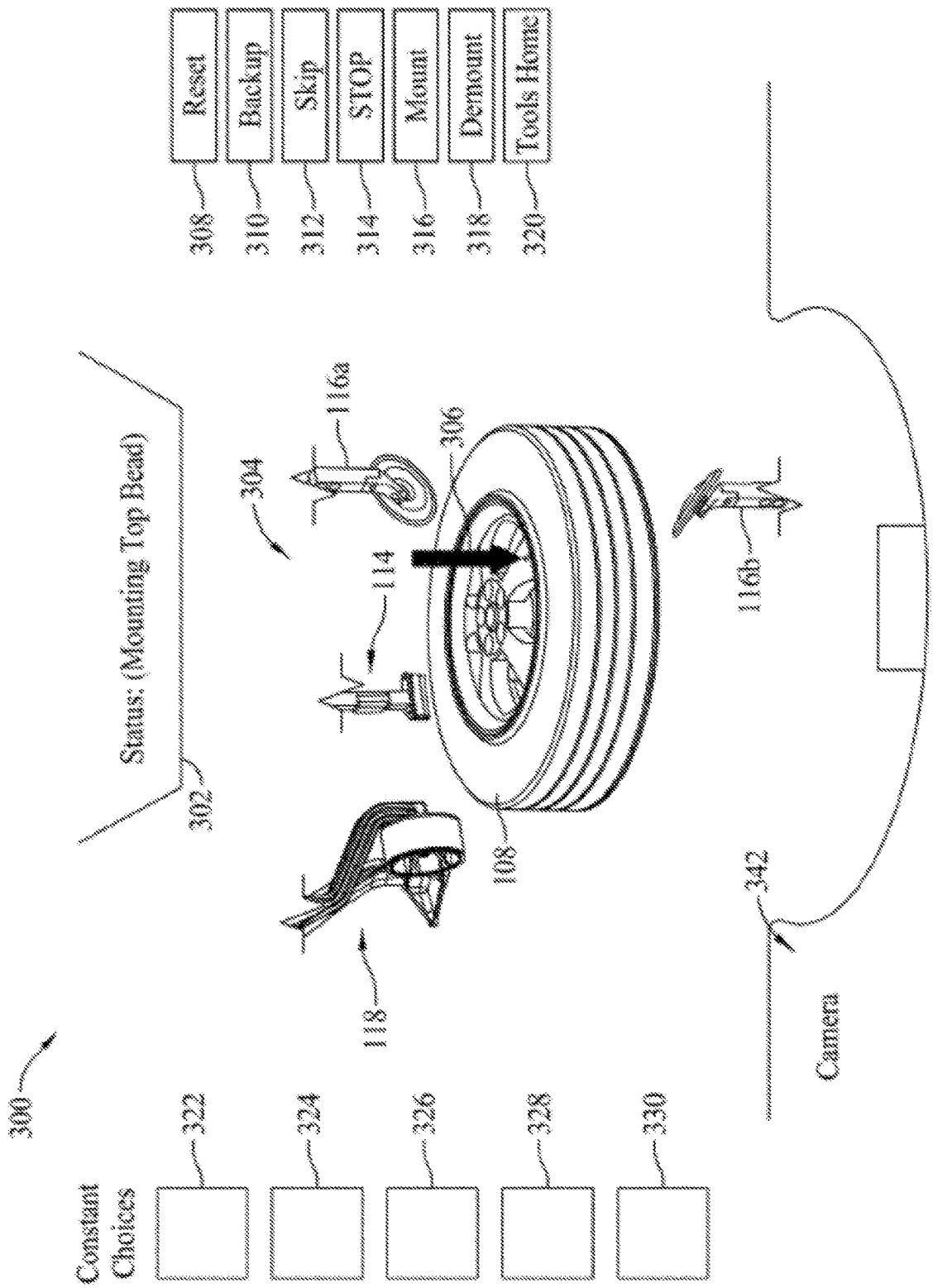
FIGURE 4 – PRIOR ART

WHEEL CLAMP ASSEMBLY FOR SEMI-AUTONOMOUS TIRE CHANGER MACHINE

CROSS-REFERENCE TO RELATED APPLICATIONS

The present application is related to, and claims priority from, U.S. Provisional Application Ser. No. 62/645,857 filed on Mar. 21, 2018, and which is herein incorporated by reference.

STATEMENT REGARDING FEDERALLY SPONSORED RESEARCH

Not Applicable.

BACKGROUND OF THE INVENTION

The present invention relates generally to tire changer machines, systems and methods and more specifically to a tire changer machine having a wheel clamp assembly configured to both secure a wheel assembly to a spindle shaft during tire service procedures, and to retain a demounted tire upon completion of a tire demount procedure.

The process of removing a tire from a wheel rim and replacing it with another tire, referred to herein as tire changing, can be difficult. In response to such difficulties, machines have been developed to facilitate the tire changing process. The tire changer machines commonly include a clamping mechanism and a drive assembly configured to rotate the wheel rim about an axis. A bead breaker tool exerts pressure on the tire adjacent the wheel rim to break the tire bead seal, and a tire removal tool, sometimes referred to as a demount tool, is used to pull the bead of the tire off the wheel rim as the wheel rim is rotated, allowing the tire to be separated from the wheel rim for removal. Manual or machine implemented tools are also utilized to press the tire onto the wheel rim for installation. While known tire changer machines have obtained some level of success in reducing the time and labor associated with changing a tire, there remains room for improvement, particularly in the handling of a discard tire following demounting from the wheel rim.

BRIEF DESCRIPTION OF THE DRAWINGS

In the accompanying drawings which form part of the specification:

FIG. 1 is a perspective view of an exemplary prior art tire changer system;

FIG. 2*a* is an illustration of a prior art wheel assembly being secured to a tire changer system by a prior art wheel clamp assembly;

FIG. 2*b* is an exploded view of the prior art wheel clamp assembly of FIG. 2*a;*

FIG. 3 is a prior art system block diagram representing exemplary prior art components of a tire changer system;

FIG. 4 is a prior art representation of a prior art graphical user interface on a tire changer system;

Corresponding reference numerals indicate corresponding parts throughout the several figures of the drawings. It is to be understood that the drawings are for illustrating the concepts set forth in the present disclosure and are not to scale.

Figure 5:
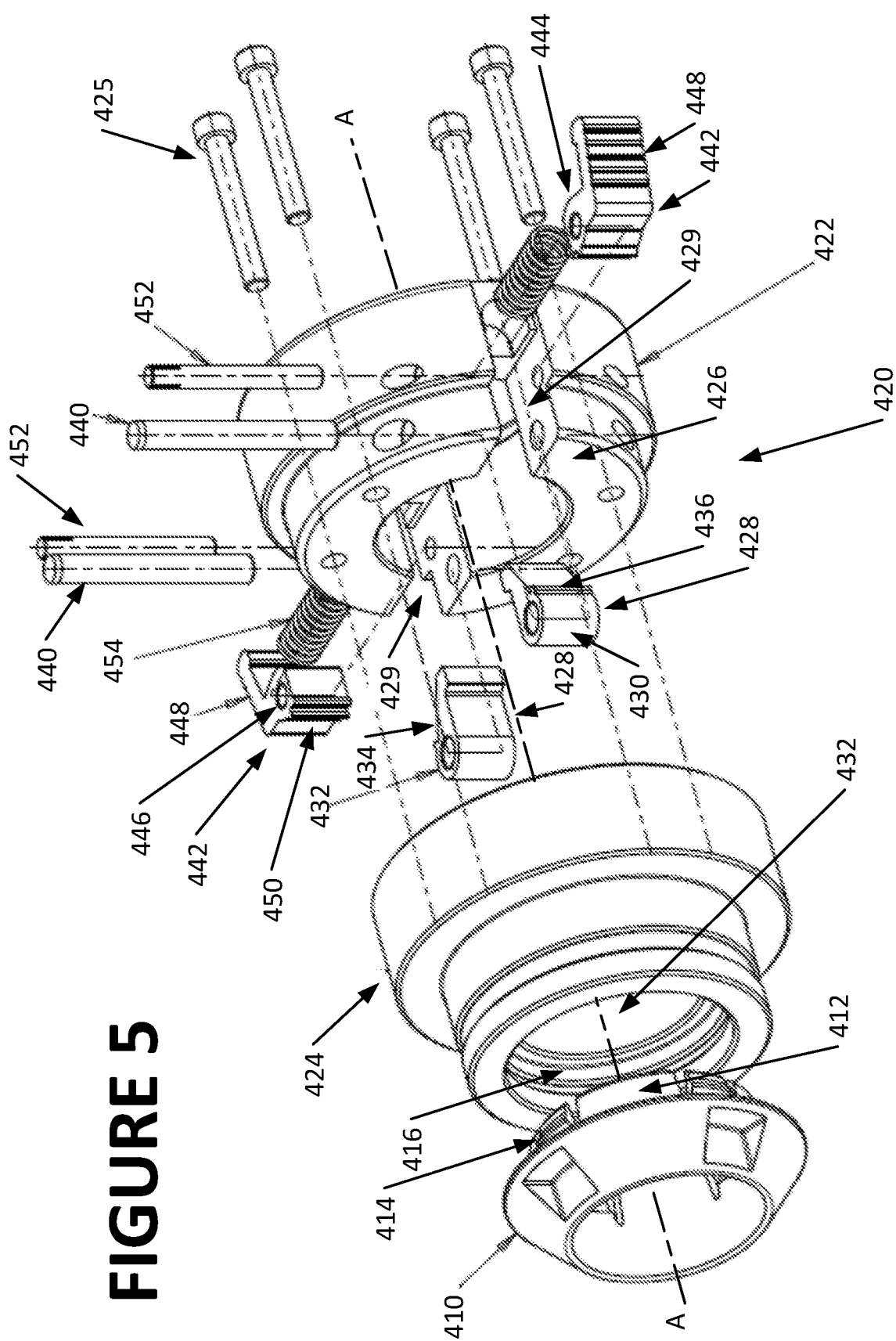
FIG. 5 is an exploded perspective view of a clamp nut assembly of the present disclosure.
Figure 6:
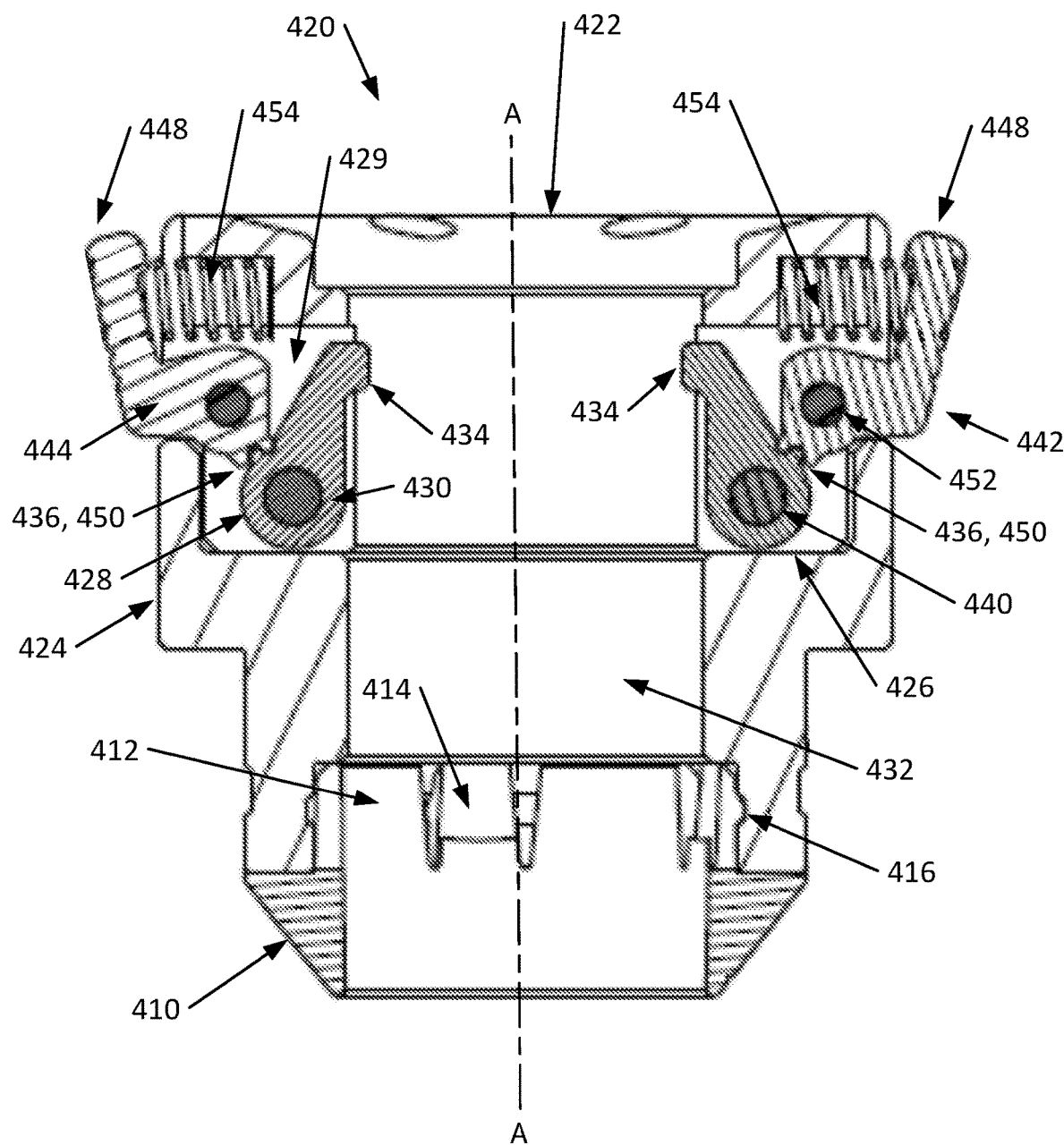
FIG. 6 is a sectional view of the clamp nut assembly of FIG. 4.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Conventionally, tire changer machines require manually operated hand tools, commonly referred to as levers, to extract tires from a wheel rim. The use of such levers involves much effort and skill on the part of the machine operators to effectively remove a tire from a wheel rim without damaging the wheel rim. In today's marketplace involving a wide variety of wheel assemblies, some of which include tires having stiff sidewalls which are very difficult to change using levers, many tire changer machine manufacturers have sought to implement machine tools that render levers unnecessary. A variety of tire demount tools exist for this purpose on modern tire changer machines. Such machines are sometimes referred to as "lever-less style" machines.

Most tire changer machines, even lever-less style ones, presently available, operate under full manual control of a skilled person such as a trained machine technician. Due to changes in the tire industry which have resulted in a proliferation of larger diameter tires, tires having shorter sidewalls, and tires having very rigid sidewalls providing run-flat capabilities, modern tires are becoming increasingly difficult to service using traditional, substantially manually performed methods, on tire changing machines. Because of such difficulties, efforts are underway to automate aspects of tire change procedures in order to offer power and speed advantages to the technician. Automating tire change procedures can avoid certain problems presented by certain tire and wheel rim combinations.

Examples of such problems encountered when changing modern tires include difficulties in clamping certain types of wheel rims without damaging them, managing excessive amount of force generated by machine tools during operation, positional conflicts between components of the tire changer machines and portions of the wheel rim and tire, properly accounting for sensitive tire and wheel rim features such as tire pressure monitoring system (TPMS) sensors, properly accounting for variations in the inner geometry in the wheel rims, an inability to dislodge and grab certain tire beads, a tendency of some machine tools to become "stuck"

in demount operations, a tendency of pusher tools to slip on the surface of certain tire sidewalls, and difficulties associated with pushing large and stiff walled tires to seat the tire beads on certain types of wheel rims.

Aspects of tire change procedures for tire changing machines may be automated. An exemplary procedure is to automate the demounting and removal of a tire from a wheel rim. In contrast to traditional tire changer machines that largely rely on the technician using a bead lever and brute force to lift the tire bead off of the wheel, a modern lever-less tire changer machine no longer depends on the bead lever or the technician's strength to lift the tire bead off of the wheel. Various mechanisms have been designed in lever-less tire changer machines, with most of them incorporating a pneumatic actuator to apply a force required to lift the tire bead off the wheel rim. Once the upper and lower tire beads have been lifted off the wheel rim, the tire is generally unrestrained by the tire changer machine, and may fall haphazardly to one side or another, occasionally rolling away from the tire changer machine if the operator is not present to control the motion of the tire. As tire changer machines become increasingly automated, the presence of an operator at the tire changer machine upon completion of a tire demount cycle is no longer guaranteed. Hence, tire changer machine providers and users would each benefit from improvements which facilitate control or retention of a discard tire once it is demounted from a wheel assembly.

FIG. 1 illustrates a prior art tire changer machine 100 including a frame or base 102 and a rotatable drive shaft assembly 104 attached to the base 102 for receiving and retaining a wheel assembly 105 consisting of a wheel rim 106 having a tire 108. The drive shaft assembly 104 may, as described in U.S. Pat. No. 8,307,874 B1 to Hanneken et al., herein incorporated by reference, be configured for movement to different positions to assist with lifting and mounting the wheel rim 106 to the drive shaft assembly 104, and may include a post or shaft positioned centrally on the base 102. As seen in FIG. 2a, the wheel rim 106 is secured to the drive shaft assembly 104 with a conventional clamping mechanism passed through a central bore in the wheel rim 106 to engage a receiver in the drive shaft assembly 104 after the wheel assembly 105 is loaded and mounted onto the tire changer machine 100. The conventional clamping mechanism consists of a clamp nut assembly, shown in FIG. 2b, disposed coaxially about a spindle and secured in an axial position on the spindle by engagement of a ring clamp with annular grooves formed in the spindle. Engagement and release of the ring clamp is by means of press tabs on the external surface of the clamp nut. The clamping mechanism terminates in a short knob, having an annular recessed region configured for an operator to easily engage between two fingers, such that the operator's thumb can simultaneously engage an axially extending release button when seating the clamping mechanism within the drive shaft assembly receiver.

After the wheel rim 106 is clamped in position, a machine operator manipulates an input selector 110a which operates the drive shaft assembly 104 to rotate the wheel assembly 105 about a drive axis 112. In different exemplary embodiments, the drive shaft assembly 104 may be pneumatically or hydraulically actuated or powered electrically. In another embodiment, a rotating clamping turntable or other rim holding mechanism may be provided in lieu of the drive shaft assembly 104 and clamping mechanism 400. Clockwise and counterclockwise rotation about the axis 112, indicated by the arrow A, are possible in different embodiments. While the drive axis 112 is illustrated as being generally vertical in the embodiment depicted, the axis 112 may be oriented horizontally or otherwise in other embodiments, and the axis 112 may be selectively adjusted to different positions relative to the base 102.

As the wheel rim 106 is rotated about the axis 112 as shown by arrow A, a tool assembly 114 may be brought into physical contact or engagement with the tire 108 in the direction of arrow B at a respective location proximate an outer periphery of the rim 106. With the tool assembly 114 in the proper position with respect to the tire 108 and wheel rim 106, the wheel assembly 105 is rotated about the axis 112 in the clockwise or counterclockwise direction of arrow A. The engagement of the tool assembly 114 with the tire 108 demounts the tire 108 from the wheel rim 106 as explained below. Additionally, the tool assembly 114 may be utilized to mount a new tire 108 to the wheel rim 106. While a single tool assembly 114 is shown to facilitate both mounting and demounting of tires 108 from the wheel rim 106, it is contemplated that separate mounting and demounting tools may likewise be provided and utilized.

The tool assembly 114 may include features such as a tire hook to separate or displace an inner circumference of the tire 108, including a tire bead surface, (not shown) over the outer lip of the wheel rim 106 to remove the tire 108 during a tire demount operation, or alternatively to engage the inner circumference of the tire 108 including the tire bead during installation or mounting of the tire 108 to the wheel rim 106. The tool assembly is further described in U.S. Pat. No. 8,973,640 B1 to Hanneken, which is herein incorporated by reference.

Machine tools 116a, 116b are provided, and sometimes referred to as bead breaker tools, to exert pressure on the sidewall surfaces of the tire 108 to either break a seal between the tire bead and the rim 106, or to push or displace the inner circumference of the tire 108 over the outer lip of the wheel rim 106 during installation of the tire 108. As shown in FIG. 1, two bead breaker tools 116a and 116b are shown, one located above the tire 108 and the other located below the tire 108. In another embodiment, a single bead breaker tool 116 could be provided. Exemplary operation of the bead breaker tools 116 are more completely described in U.S. Pat. No. 8,613,303 B1 to Hanneken et al., which is herein incorporated by reference.

Machine tools 118a and 118b are also provided and sometimes are referred to as pressing tools, pusher tools, or bead pressing devices. As shown in FIG. 1, bead pressing devices 118a, 118b exert pressure on the tire sidewall during tire mounting and demounting procedures. As shown, bead pressing device 118a is a roller device mounted for rotation about an axis 120 substantially perpendicular to the machine drive axis 112. Thus, when the roller device 118a is placed in contact with a tire sidewall, it rotates about the axis 120 as the tire 108 is rotated about the machine drive axis 112, such that the device 118a remains in a fixed position relative to the machine drive axis 112. When desired, the roller device 118a is also operable to rotate in tandem with the tire 108 about the drive axis 112.

The bead pressing device 118b is adapted for contact with the tire 108, and includes a frictional engagement surface to facilitate movement relative to the tire. When engaged with the tire sidewall, the pressing device 118b rotates about the drive axis 112 with the tire 108. Optionally the pressing device 118b may incorporate a feature for engaging a spoke, a hole, or other feature of the wheel rim 106 to ensure that the pressing device 118b (and also the tire 108 with which it is engaged) rotate along with the wheel rim 106, and that the pressing device 118b does not move relative to the wheel rim 106. Alternatively, the pressing device 118b may be coupled with an independent drive mechanism 122 configured to push the bead pressing device 118b and the tire 108 in the direction of rim rotation about the drive axis 112. This establishes a "traction point" in addition to pushing the tire bead into the drop center of the wheel rim 106 when mounting the tire 108.

The pressing tools 118a, 118b may be spaced from one another to maintain the tire bead in a drop center of the wheel rim 106 during a tire demounting procedure, or to push the tire bead into the drop center during a tire mounting procedure. While two bead pressing devices 118a and 118b are shown in FIG. 1, additional bead pressing devices 118 may be provided. Two or more bead pressing devices 118 are beneficial for mounting or demounting larger diameter tires and stiffer tires, although it is understood that in some cases a single bead pressing device 118 may be sufficient to mount or demount certain types of tires. Operation of the pressing tools and the independent drive mechanism are more completely described in U.S. Pat. No. 8,387,675 B1 to Vaninger et al, which is herein incorporated by reference.

In different exemplary embodiments, the tool assembly 114, and the tools 116, 118 may be pneumatically, electrically, or hydraulically actuated, and serve to supply sufficient tire insertion or removal forces at the correct angles and locations with respect to the tire 108 such that the bead of the tire 108 is forced out of, or into, a bead seat on the wheel rim 106. While exemplary tools 116, 118 are illustrated in combination with the tool assembly 114, still other tire changing tools and devices may be provided and used for bead breaking, tire mounting and/or demounting, locating a valve stem, locating a wheel weight, locating a wheel sensor such as a Tire Pressure Monitoring System (TPMS) sensor, or other purposes. Such other tools may be provided in addition to, or in lieu of, the tools 116, 118 as depicted.

To assist with locating the tool assembly 114 and the tools 116, 118 a sensory capability may further be provided in the machine 100 to detect a position of the tool assembly 114 and the tools 116, 118 (or other tools that may be provided) with respect to the tire 108 and/or wheel rim 106. For example, a switch mechanism may be included that changes state when a bead breaker tool moves just beyond the outer edge of the wheel rim 106, ensuring that the tool is positioned to engage the tire 108 at a predetermined location. Machine vision systems are also known to assist in aligning the machine tools with respect to the wheel rim 106 at predetermined locations. Force feedback sensors may be integrated as further monitoring and control features for the machine components, including but not limited to the machine tools. While such sensory capabilities may be beneficial, in some embodiments they may be considered optional and accordingly may not be present or utilized.

The machine 100 as shown in FIG. 1 includes a support tower 130 extending from the base 102 at a location spaced from the drive assembly 104. The support tower 130 extends to a height above any wheel assembly secured to the drive assembly 104. A linkage 132 extends outwardly from the support tower 130, and the pressing tools 118a, 118b are coupled to the linkage 132. The linkage 132 is movable by an actuator on the support tower 130 in a direction parallel to arrow B in FIG. 1, such that as the linkage 132 moves, the bead pressing devices carried on the linkage 132 are moved either towards or away from the tire 108. As such, the bead pressing devices 118a, 118b may be moved in a direction parallel to the machine drive axis 112.

In addition to movement parallel to the machine drive axis 112, the bead pressing devices 118a, 118b are mounted to the linkage 132 such that they are rotatable about an axis 136 that is fixed and coincident with the machine drive axis 112. That is, the pressing devices 118 are rotatable about the axis 136 that is coaxial with the machine drive axis 112. Because the axis 136 is coincident with the drive axis 112, when the bead pressing devices 118 are in contact with the tire 108, the bead pressing devices 118 may rotate with the tire 108 as it is rotated about the drive axis 112. Unlike conventional tire changing machines, including but not limited to so-called swing-arm style machines, the rotational axis 136 for the bead pressing devices 118 is fixed at a set distance and location from the tower support frame 130.

While locating the rotation axis 136 of the pressing devices 118 at a fixed and set distance and location from the tower support frame 130 can be beneficial for the reasons stated, it is recognized that in further and/or alternative embodiments, neither the location of the drive axis 112, nor the rotational axis 136 for the pressing devices, need necessarily be fixed in such a manner so long as the axes 112 and 136 are positionable to become coincident when the pressing devices 118 are utilized. That is, either or both of the axes 112 and 136 may be movable to different positions, distances and orientations relative to each other, and relative to the tower support frame 130, for reasons not pertinent to the use of the pressing devices 118a, 118b, but when the pressing devices 118a, 118b are to be engaged to the tire, the axes 112 and 136 are moved to become coincident once again so that the bead pressing devices 118 may rotate with the tire 108 about the drive axis 112.

The bead pressing devices 118a, 118b are further movable in a direction perpendicular to the axis 136 and the drive axis 112. That is, actuators are provided that move the bead pressing devices 118a, 118b toward, and away from, the drive axis 112, such that the bead pressing devices 118 may be manually or automatically adjusted to different radial positions measured from the drive axis 112 accommodating tires and rims of different diameters. The bead pressing devices 118 may also be manually or automatically positioned in the direction perpendicular to the drive axis 112 as described below.

The bead breaker tools 116a, 116b are also coupled to and supported by the tower support frame 130 (or other support structure in an alternative embodiment) via linkages that also movable in vertical and horizontal directions to position the bead breaker tools 116a, 116b relative to the wheel rim 106 and tire 108 during use.

The tool assembly 114 is likewise coupled to a support 138 and associated linkages on the tower support frame 130 by actuators such that the support 138 is movable relative to the tower support frame 130 in the vertical and horizontal directions. As such, the tool assembly 114 is movable radially toward and away from the drive axis 112, and toward and away from the wheel assembly 105 in a direction parallel to arrow B. The tool assembly 114 in the illustrated embodiment is independently positionable from the tools 116, 118, although it is understood that the assembly 114 and the tools 116, 118 may be used in concert while changing the tire 108. While the tool assembly 114 and the tools 116, 118 are each coupled to the tower support frame 130 in the exemplary embodiment depicted, they could alternatively be supported with independent support frames and structures provided on the machine 100 in place of a single tower support frame 130.

The positions of the various components 114, 116, and 118, and operation of the drive assembly 104 and other features of the machine 100 may be coordinated by a control unit. The control unit includes a programmable controller and actuator components operatively connected to the programmable controller.

A machine operator may manipulate input selectors 110a, and 110b to direct the control unit to move the tool assembly 114, and the tools 116, 118 to desired positions, to operate the drive assembly 104, or to activate other machine features. In illustrative embodiments, the input selectors 110a, 110b are foot pedals located near the bottom of the machine base 102 for convenient use of the machine operator(s). In other embodiments, other known input devices 154, including but not limited to levers, buttons, knobs, switches, joysticks, and touch sensitive display 152 may be employed in various locations on or near the machine 100. An operator station 150 including a display 152 and an input device 154 including a keyboard or other input selectors may be optionally provided for the benefit of the operator.

Various ways of automating certain tire change procedures using force and position feedback sensors and the like facilitate automated machine operations, avoiding human errors and the numerous difficulties heretofore experienced in operating the machine tools with varying degrees of involvement by human operators. FIG. 3 schematically illustrates a prior art control system 200 implemented in the machine 100 to change tires in an automated, but interactive manner with a human operator, as described in U.S. Pat. No. 9,434,219 B1 to Clasquin et al., herein incorporated by reference. Using the control system 200, tire change procedures can be substantially automated such that little or no operator input is required, but nonetheless allowing human operators an ability to control, oversee and adjust machine operations if needed or as desired. The control system 200 provides the benefits of full automation of certain aspects of tire change procedures while leaving other aspects in the discretion and manual control of the machine operator. As such, varying amounts of operator participation in tire demount procedures are available.

The control system 200 generally includes a controller 202 operatively coupled to actuators directing the various tools provided on the tire changer machine 100. More specifically, the controller 200 is operatively coupled to an actuator 204 associated with the drive assembly 104, an actuator 206 associated with one of the pressing devices 118, an actuator 208 associated with one of the bead breakers 116, and an actuator 210 associated with the mount and de-mount tool assembly 114. Position sensors 212 and force sensors 214, such as those described in U.S. Pat. No. 8,770,254 B1 to Hanneken et al. and U.S. Pat. No. 8,387,675 B1 to Vaninger et al. may provide closed loop control feedback as shown, and facilitate positioning of the tools in the appropriate locations for particular tire change procedures in an automated manner.

The actuators 204, 206, 208 and 210 each correspond to multiple actuators to drive the associated components and effect movement therefore in three dimensional space. Rotational movement is provided, for example, with the actuator 204 for the drive assembly 104. Linear movement in vertical and horizontal directions, for example, is provided by different actuators associated with the machine tools 114, 116 and 118. Using the respective actuators, the drive assembly 104 is operated to rotate the wheel assembly 105 about the drive axis 112 to and from desired rotational positions. Similarly, a radial position of the machine tools 114, 116, 118 measured in a direction perpendicular to the drive axis 112 (FIG. 1) can be adjusted to meet varying diameters of wheel rims 106 and tires 108, and axial positions of the tools 114, 116, 118 may be adjusted along an axis parallel to the drive axis 112 to engage or disengage the tools to and from the tire 108. The tools 114, 116, 118 apply directed pressure at the appropriate locations on the tire 108 to mount or demount the tire 108 to and from the wheel rim 106.

Further feedback elements such as machine vision elements may be provided in the control system 200 to facilitate automated positioning of the drive assembly 104 tools 114 without the machine having prior knowledge of a rim type or tire type involved in the demount procedure. In such scenarios, the profile needed to position the tool assembly 114 may be self-identifying to the machine 100.

Controller 202 may be coupled with a spindle actuator (not shown) to move the drive axis 112 laterally relative to the machine base 102. Thus, for example, in such an embodiment the drive axis 112 (and also the tire 108 and wheel rim 106 coupled to the drive axis 112 with the clamping mechanism) may be moved by the spindle actuator in a direction towards or away from the tower support frame 130 shown in FIG. 1. A machine equipped with such a spindle actuator may therefore move the drive axis 112 towards and away from the various tools 114, 116 and 118. The spindle actuator may likewise be equipped with force and position sensors providing an ability for automated, closed loop control of the actuator.

In various embodiments, the controller 202 is one of a microcomputer, a programmable logic controller, or other processor-based device configured with suitable program instructions. Accordingly, the controller 202 may include a microprocessor 216 and a memory 218 for storing instructions, control algorithms and other information as required for the machine 100 to function in the manner described. The controller memory 218 may be, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 202 with equal effect to serve similar objectives. For example, a super-capacitor may be provided to give the controller time to store procedure sensitive data such as the current state in a software based state machine in the event of power loss. Other elements such as line filters and capacitors for filtering noisy power may be included. Disk storage such as a CD-ROM, DVD, or hard disk may be provided for storage of various tire profiles that may be recalled to optimize tire mount or demount processes. The tire profiles may include detailed data regarding dimensional aspects of tires to be changed and other information concerning the tires that may be useful and beneficial to the machine operator or the control system.

In various exemplary embodiments of the control system 200, the actuators 204, 206, 208 and 210 may respectively include hydraulic cylinders, pneumatic actuators, electric motors, or still other types of actuators. The actuator types for the actuators 204, 206, 208 and 210 may be of the same or different type (e.g., hydraulic, pneumatic, electric or other) in numerous variations of machines.

Likewise, in various exemplary embodiments, the position sensors 212 utilized in the control system 200 may consist of positioning encoders, proximity switches or other switch devices, Hall Effect sensors, machine vision elements and other sensors and technologies known in the art. More than one type of positioning sensor or sensing technology may be utilized in numerous variations of machines with similar effects.

The control system 200 may also include a dead man control element 220 and a graphic user interface (GUI) 222. The dead man control element 220 and GUI 222 allow for limited control of the automated functionality of the machine as well as informational feedback for the operator regarding execution of automated tire change procedures. It should be noted that, as used herein, the term "procedure" shall refer to a controlled movement of one or more machine components for a particular purpose to accomplish a task in a tire change process executed with the machine. A procedure may include a single step or movement involving a single actuator and a single component of the machine (e.g., the drive assembly 104 or the tools 114, 116, 118), multiple steps or movement involving a single actuator or component, single steps or movements of multiple actuators and components, or multiple steps or movements of multiple components An operator may select, using the GUI 222, a specific procedure or procedures to be run from available procedures stored in the controller memory 218, and therefore provide an input to the machine concerning which of the various tire change procedures is desired, and to some extent the order that the procedures that may be executed. Likewise, with or without assistance of the GUI 222, a human operator may manipulate one or more input selectors or control elements that cause execution of a specific automated tire change procedure such as, for example only, a wheel lift procedure, a lower tire bead loosening procedure, an upper tire bead loosening procedure, and an upper bead demounting procedure, among others. A number of other procedures and control routines and algorithms may likewise be selected, including but not limited to locating tire valve stems, locating TPMS sensors, locating wheel weights, and locating machine tools in proper locations. Such selection of specific procedures may be advantageous when certain procedures are known to the operator to be inapplicable. For example, if it is known that a given wheel rim does not include wheel weights or if it is known that TPMS sensors are not included, procedures designed to detect the wheel weights or TPMS sensors need not be run to successfully complete a tire change.

A machine operator may select a procedure that incorporates multiple specific procedures with the end result being complete tire removal or complete tire mounting. For example, rather than selecting specific procedures, the operator may simply select a tire mount mode or a tire demount mode. When the mount or demount modes are selected, the controller 202 recalls and runs in series all the various procedures pertinent to the mode selected. This may result in slower tire change times, however, as the machine may in such instances run wheel weight detection and TPMS sensor detection procedures when in fact, none are present.

In either case, the tire changing machine 100, and more specifically the controller 202, may include a memory 218 for storing information related to an automated tire change procedure or series of procedures. The information may include motion paths, data points and other information for operating the machine components to rotate the wheel rim and tire, and to engage and disengage the various machine tools with the tire at appropriate locations. Force and position profiles associated with each of the machine components may be loaded in the controller memory 218 or in other memory associated with the control system 200 and compared to actual conditions while the machine is in use to make control decisions as explained in the related applications. In other embodiments, however, absolute predefined motion paths for the machine components may be stored in the controller memory and executed in an open loop control scheme.

The tire changing machine 100, by virtue of the control system 200, may also include an operational mode where a manually performed aspect of a procedure determined by a human operator is saved and recorded into memory 218, for example, for future recall and use by the machine 100. That is, the human operator can manually position the machine tools or other components to perform some or all of a procedure, and the controller 202 can remember the positioning path of the tools utilized if the operator chooses to save the manually performed procedure. As such, in addition to having multiple pre-programmed automated procedures, the machine 100 may "learn" new and additional procedures as needs arise or according to operator preference.

For example, while the machine 100, and more specifically the controller 200, can be pre-programmed with various algorithms to execute various procedures on a variety of different wheel rims and tire sizes, an operator may determine that a variation from the pre-programmed procedures is needed or desirable, to complete the procedure on certain wheel rim and tire combinations. The machine 100 may intelligently learn and repeat appropriate start positions for tire demount procedures with some operator assistance. For example, an operator may manually position the tool assembly 114 relative to any given wheel rim 106, and the controller 202 may save the vertical and horizontal positions known to it via the sensors to create profiles for future use and recall for tires and rims of similar types, which can be linked to identifiers provided by an operator or otherwise selected on the machine 100. Thereafter, a machine operator can enter or select the identifier and the controller 202 can automatically operate the actuator 210 to move the mount and demount tool 114 to the corresponding start position(s).

In still another embodiment, the controller 202 may be pre-programmed with predetermined start positions, or otherwise retrieve start positions from a database or other source, and use those start positions to execute pre-programmed tire change procedures. In such a scenario, the machine operator need not teach the start positions to the machine 100, but rather must only enter or select the pertinent identifiers for wheel rim 106 and tire 108 combinations so that the machine can locate the appropriate profile for use in a demount process.

During operation of the tire changer machine 100, the operator may use various input selectors 154 and control devices 110 to manually control the machine 100. The input selectors are typically labeled and the technician decides which control to use to perform the desired task. As a tire changer becomes automated, however, it is more important for the technician to have access to information relating to specific processes being executed in case some change or interaction is required. A graphical user interface 222 is therefore provided to display such information to the technician on a display 152.

In an exemplary embodiment, the GUI 222 may be a touch sensitive screen display or monitor 152. The screen or monitor may be a known electronic visual display that can detect the presence and location of a touch within a designated display area or areas. Various types of touch screens are known and may be used, including but not limited to resistive, capacitive and infrared touch detection. In other embodiments, the GUI 222 need not necessarily be touch sensitive, and input selectors such as a mouse, joystick, or touchpad can be provided to make selections on the GUI 222.

The GUI 222 may present user interface displays and information screens to the operator, including but not limited to alerts graphically depicting upcoming critical operations or decision points so the operation of the machine is intuitive and the overall operating environment is improved. The user interface displays and screens may capably present voluminous amounts of data and details in easy to use, menu-driven form with intuitive links and graphical displays to quickly understand the machine selections, the current point of execution at each step in the procedure, and even provide step-by-step results and feedback to the operator as the machine 100 is used.

The user interface displays presented in the GUI 222 may be implemented conventionally in a computer program embodied on a computer readable medium and having segments of code or instructions executed by the controller processor 216, for example, that correspond to the various functions and features described.

FIG. 4 is an exemplary screen display 300 that may be presented with the GUI 222. The screen display 300 may include a status field 302 identifying to the user the current status of the machine 100. In the example of FIG. 4, the status provided is "Mounting Top Bead" and corresponds to a procedure available on the machine for manual or automated execution. A graphical section 304 is presented centrally on the screen display 300 and includes pictorial images or drawings of certain machine components (e.g., the machine tools 114, 116 and 118) in relation to the tire 108 as well as a reference point indicator 306 indicating a point of interest on the tire 108 such as a valve stem. The graphical section 304 may be animated so that one can see the images moving as the machine operation continues to execute the procedure.

Selection areas are provided to the left and right of the graphical section 304 on the exemplary screen 300. In the exemplary screen 300, on the right hand side are a reset selection area 308, a backup selection area 310, a skip selection area 312, a stop selection area 312, a mount selection area 314, a demount selection area 316 and a tools home selection area 320. On the left hand side of the exemplary screen are an additional series of possible selection areas 322, 324, 326, 328 and 330 which may or may not be available, depending upon the status of the machine. These selection areas are believed to be self-explanatory. Depending on the status of the machine, not all of these selection areas may be present for selection, or different selection areas may be provided. For example, when the first of the procedures in the mount or demount modes per the selection areas 316 and 318 are being executed, the backup selection feature 310 will not be presented. Likewise, required procedures cannot be skipped and the skip selection area 312 will not be presented, and the tools home area 320 will not be presented when the tools are already in a home position on the machine 100.

The exemplary screen displays shown and described are intuitive in nature and offer sufficient guidance for operators to take appropriate actions. The screen displays are, however, provided for the sake of illustration rather than limitation, and other intuitive and user friendly displays including other options, information and fields may likewise be provided with similar effect.

It is believed that those in the art may program the controller 202 or otherwise configure it to implement the user interface and processes reflected in the exemplary screen display without further explanation. It is recognized that not all of the process steps as shown and described to present options, information, and prompts to a user, as well as accepting prompts and operating the machine pursuant to selected options, are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may be implemented in combination with the steps described.

When operating the tire changer machine 100, a preliminary step required before performing a wheel assembly service procedure such as to demount a tire 108 from a wheel rim 106, is to secure the wheel rim 106 to the drive shaft assembly 104. Generally, the wheel rim 106 is secured to the drive shaft assembly 104 by means of a clamping mechanism 400 which retains the wheel rim 106 in an axially centered position against an axial end of the drive shaft assembly. The clamping mechanism 400 consists of several main components, including a wheel cone 410, a clamp nut assembly 420, and a quick release spindle assembly 500, which cooperatively function to engage the drive shaft assembly 104 and retain the wheel rim 106, such as is shown generally in FIG. 2.

To secure the wheel rim 106 to the drive shaft assembly 104, the wheel rim 106 is first positioned on the axial end of the drive shaft assembly 104, such that an axial bore of the wheel rim is coaxial with a receiver having a bore in the axial end of the drive shaft assembly 104. Next, the clamp nut assembly 420, including a wheel cone 410 having an outer conical taper sized to seat partially within the wheel rim axial bore is positioned on a quick release spindle assembly 500, and the quick release spindle assembly 500 is passed through the wheel rim axial bore and locked into a releasable engagement within the bore of the drive shaft assembly receiver. The clamp nut assembly 420 is moved along the quick release spindle assembly 500 until the outer conical surface of the wheel cone 410 is in close proximity to the wheel rim axial bore, and mechanically engaged with the quick release spindle assembly. Finally, the drive shaft assembly 104 is activated to draw the receiver axially downward within the drive shaft assembly 104, drawing the quick release spindle assembly 500, the engaged clamp nut assembly 420, and wheel cone 410 axially into clamping engagement with the peripheral edges of the wheel rim axial bore, securing the wheel rim 106 to the drive shaft assembly 104. To release the wheel rim 106 from the drive shaft assembly 104, the process is simply reversed.

With reference to FIGS. 5-8, the various mechanical components of the clamp nut assembly 420 and quick release spindle assembly 500 of the current disclosure are shown. The clamp nut assembly 420 consists of an annular body 422 and a collar 424 adapted at a first axial end 426 to engage a reduced-diameter axial end 428 of the annular body 422. The collar 424 is secured in engagement with the annular body 422 by a set of threaded cap screws 425 passing through bores in the annular body and into the collar 424 axial end 426. The second axial end 430 of the collar 424 is configured to receive a shaft extension 412 of the wheel cone 410 within an axial bore 432, such that locking tabs 414 on the shaft extension 412 engage an annular channel or seat 416 within the axial bore 432 to retain the wheel cone 410 in place. When assembled, the wheel cone 410, annular body 422, and collar 424 define a continuous axial bore A-A through the clamp nut assembly for axially receiving the quick release spindle assembly 500.

The clamp nut assembly 420 is secured to the quick release spindle assembly 500 by a pair of lock pawls 428.

Each lock pawl 428 consists of a cylindrical pawl body 430 having a bore 432 and a tangential extension tab 434 configured to engage the quick release spindle assembly 500. A single gear tooth 436 is disposed on an outer surface of the lock pawl body 430, parallel to the bore 432. The lock pawls 428 are seated within diametrically opposite channels 429 in the axial end 428 of the annular body 422. Dowel pins 440 seated in bores in the annular surface of the axial end 428 pass through the bores 432 in the lock pawl bodies, retaining the within the channels for pivoting movement. Engaging each lock pawl 428 is a corresponding release pawl 442, consisting of a cylindrical pawl body 444 having a bore 446 and a tangential extension tab 448 with a textured exterior surface. A set of gear teeth 450 disposed on an outer surface of the release pawl body 444, parallel to the bore 446, engage the gear tooth 436 of the associated lock pawl 428 when the release pawl is retained within the channel 429 by a pin 452 passing through bores in the annular body 422 aligned with the bore 446. A compression spring 454 is retained between each tangential extension tab 448 and a seat at the base of each channel 429. The compression spring exerts a radially outward force on each extension tab 448, resulting in rotation of the release pawls 442 about the pins 452, and correspondingly, through engagement of the gear teeth 436, 450, rotation of the locking pawls 428 about the dowel pins 440 to engage the extension tabs 448 with the quick release spindle assembly 500, securing the clamp nut assembly to the quick release spindle assembly. Pressing the extension tabs 448 radially inward to compress each spring 454 rotates the release pawls 442 about the pins 452 in a reverse direction, and correspondingly, through engagement of the gear teeth 436, 450, reverses rotation of the locking pawls 428 about the dowel pins 440 to disengage the extension tabs 448 from the quick release spindle assembly 500, releasing the clamp nut assembly for axial movement along the quick release spindle assembly.

Figure 7:
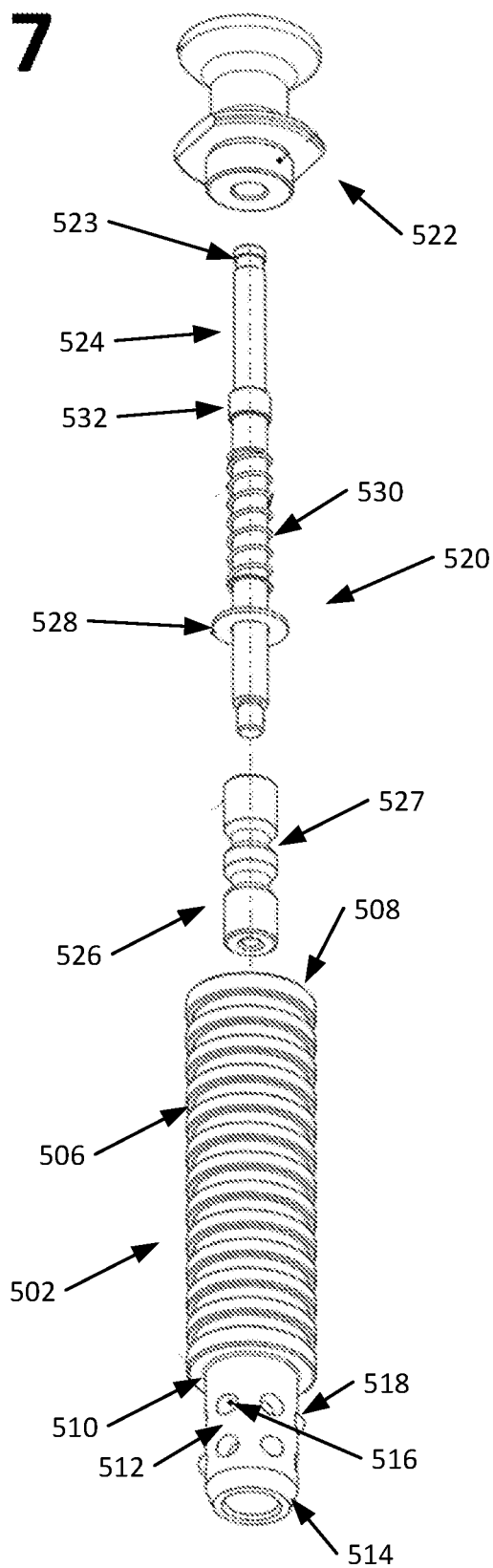
FIG. 7 is an exploded perspective view of a quick release spindle of the present disclosure.
Figure 8:
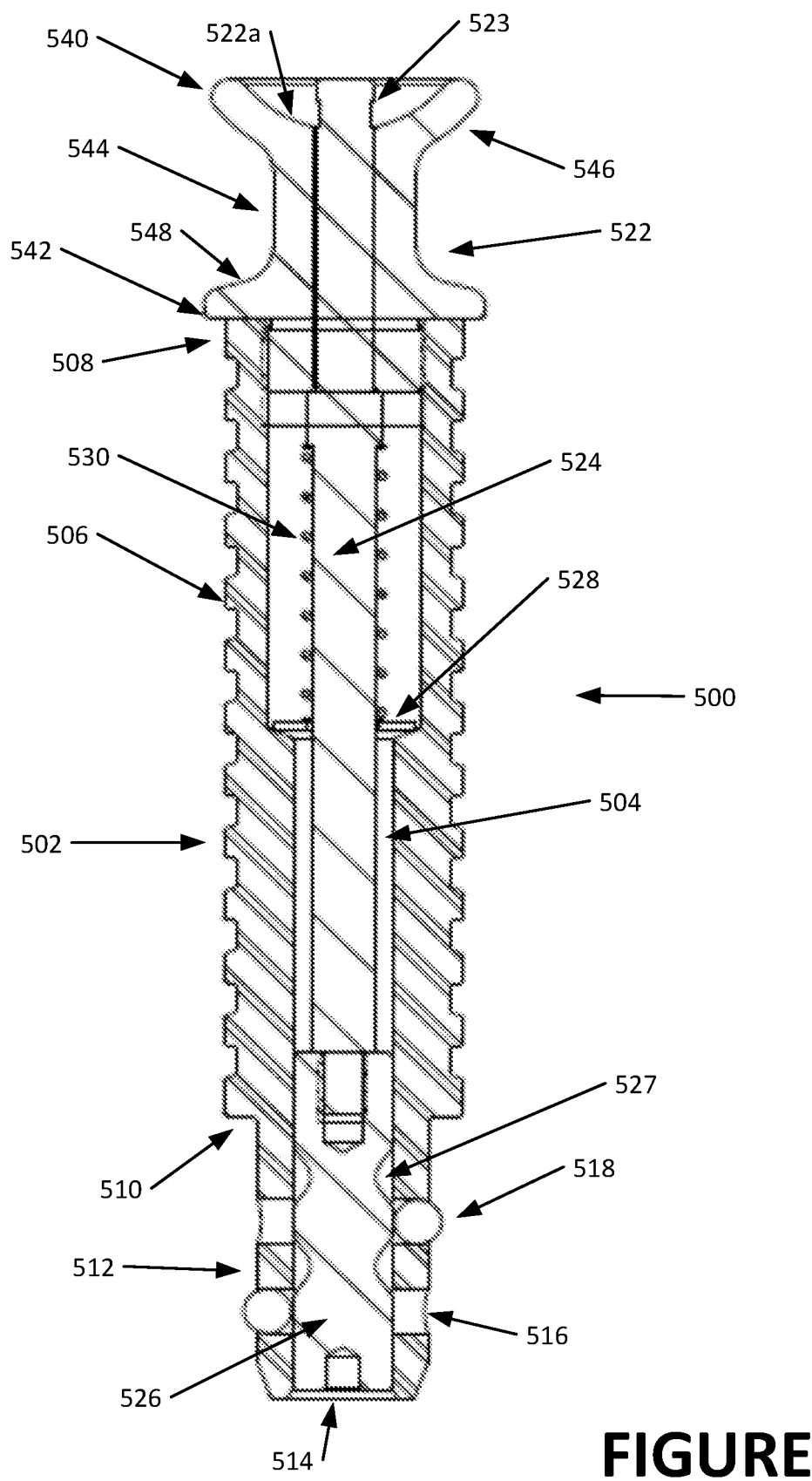
FIG. 8 is a sectional view of the quick release spindle of FIG. 6.

The quick release spindle assembly 500, illustrated in FIGS. 7 and 8, consists of a cylindrical shaft body 502 having an axial bore 504. An outer grooved surface 506 extends from an upper axial end 508 to an annular shoulder 510. A smooth outer surface 512 extends from the annular shoulder to a lower axial end 514 of the body 502. The smooth outer surface 512 is perforated by a plurality of radially directed bores 516 arranged in sets at common axial positions. Within each set, bores 516 are alternately sized to pass and retain ball bearings 518.

A plunger assembly 520 is fitted within the axial bore 504 to axially shift between a lock position in which the ball bearings 518 disposed in circumferentially alternate bores 516 are displaced radially outward to protrude outward from the smooth outer surface 512, and a release position in which the ball bearings 518 are able to fully retracted within the bores 516. The plunger assembly 520 consists of a knob 522 secured into the upper axial end 508 of the bore 504, and a spring-biased rod 524 seated within the axial bore 504. The rod 524 passes coaxially through the knob 522 to terminate at a lock-indicator 523, in proximity to a recessed upper surface 522a of the knob. A plunger shaft 526 is secured to the opposite axial end of the rod 524 within the axial bore 504, and includes annular races 527 on an outer surface adapted to receive the ball bearings 518 when in axial alignment with the radial bores 516. The plunger shaft 526 is axially biased towards a locked position in which the annular races 527 are axially displaced from the radial bores 516 by a compression spring 530 acting on the rod 524. The spring 530 is entrapped coaxially about the rod 524, between a washer 528 abutting a shoulder within the bore 504, and an annular boss 532.

Applying an axial force to the lock-indicator 523 on the end of the rod 524 compresses the spring 530, axially displacing the rod 524 and plunger shaft 526 within the bore 504 to shift the annular races 527 into alignment with the radial bores 516. While the annular races 527 are in alignment with the radial bores 516, the ball bearings 518 are free to displace radially inward within the bores 516, enabling the smoother outer surface 512 to be seated within a matching axial receiver on the drive shaft assembly 104. Once seated, a release of the axial force permits the spring force from spring 530 to axially displace the rod 524 and plunder shaft 526 back to the locked position, driving the ball bearings 518 radially outward in the bores 516 and into locking engagement with corresponding annular races in the matching axial receiver of the drive shaft assembly 104. With the ball bearings engaged, the quick release spindle assembly 500, and the clamp nut assembly 420 fitted coaxially thereto, are secured to the drive shaft assembly 104, and may be drawn in an axially downward direction by the engaged axial receiver of the drive shaft assembly 104 to engage and hold a wheel rim 106 during a tire mount or demount procedure.

Figure 9:
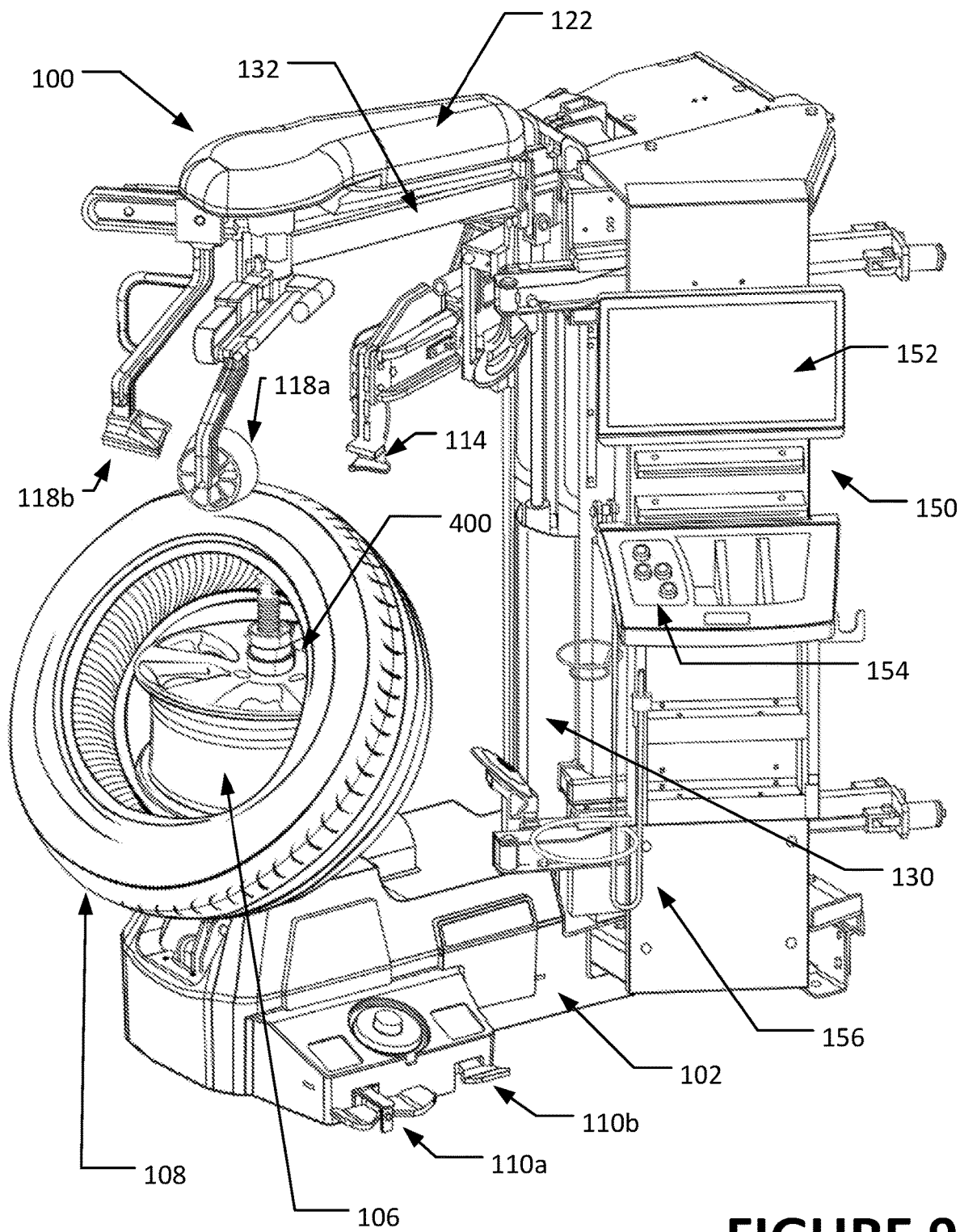
FIG. 9 is a perspective view of a tire changer system in operation with the clamp nut assembly of FIG. 5 holding a demounted tire.
Figure 10:
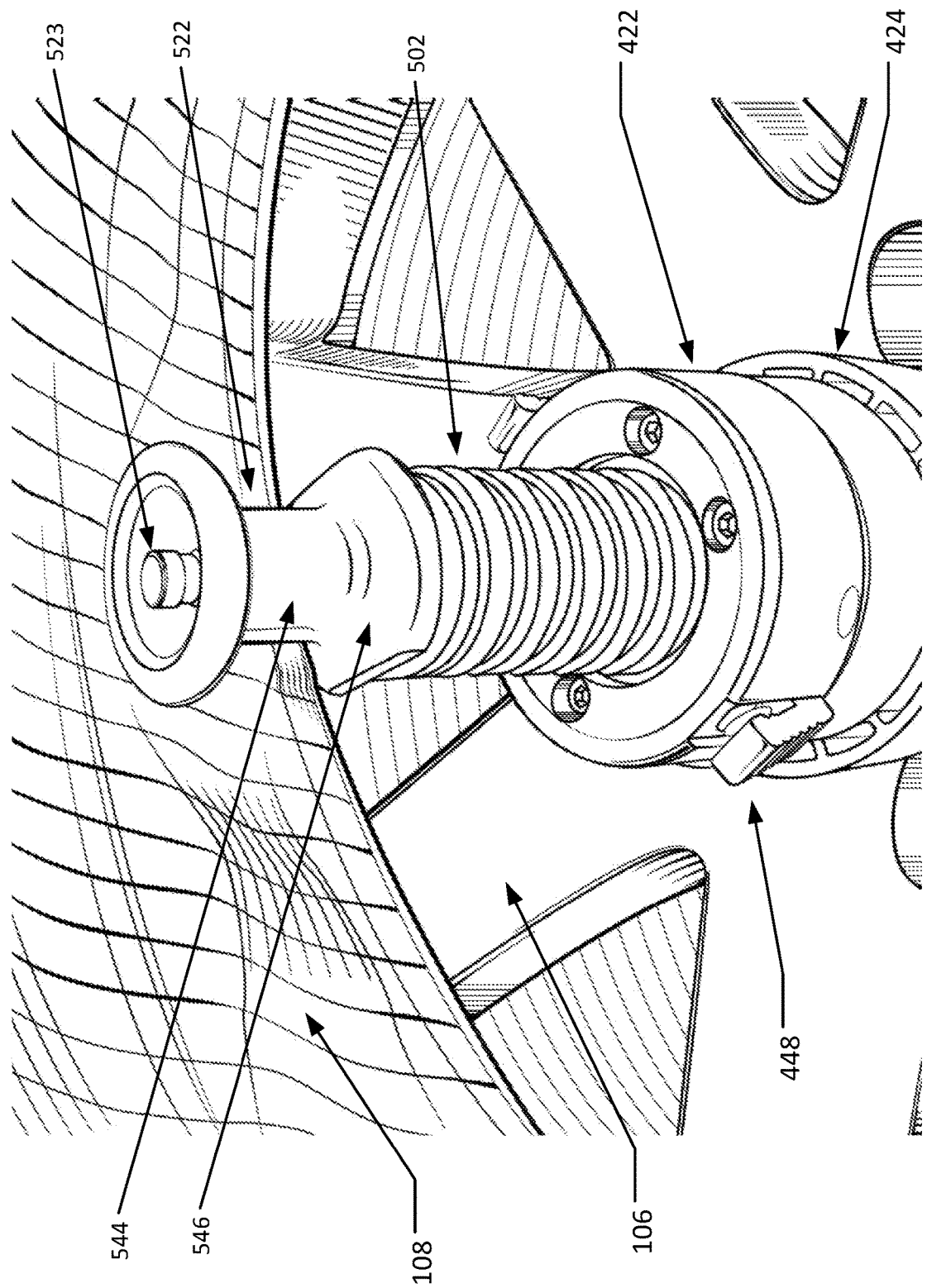
FIG. 10 is a perspective view close-up view of the engagement between the clamp nut assembly and the demounted tire shown in FIG. 9.

When a tire 108 is demounted from a wheel rim 106 secured to the drive shaft assembly 104, the demounted tire 108 will typically be lifted above the wheel rim 106, tipped to a side of the wheel rim, and be allowed to fall or drop to the ground. Absent any operator intervention or control, the demounted tire 108 may bounce or roll away from the tire changer machine 100, potentially in an unpredictable manner. As seen in FIGS. 7 and 8, the knob 522 at the upper end of the quick release spindle assembly 500 includes an upper annular flange 540 and a lower annular flange 542, with a longitudinally extended reduced diameter annular region 544 disposed there between to serve as a tire retention member. The transition surface 546 between the region 544 and the upper flange 540 is defined by a smooth surface in the general form of a spherical sector, while the transition surface 548 between the region 544 and the lower flange is defined by a smooth surface in the general form of a conical frustum. During a tire demount procedure, the lower circumferential bead edge or lip of the demounted tire 108 will be captured in the reduced diameter annular region 544 of the knob 522 as the tire tips to the side of the wheel rim 106, as shown in FIGS. 9 and 10, preventing the demounted tire 108 from falling to the ground. When an operator is ready to fully remove the demounted tire 108 from the tire changer system 100 in a controlled manner, the transition surface 546 allows the lower bead or lip of the demounted tire to be slid up and off of the knob 522 without snagging or catching on the knob.

As various changes could be made in the above constructions without departing from the scope of the disclosure, it is intended that all matter contained in the above description or shown in the accompanying drawings shall be interpreted as illustrative and not in a limiting sense.

The invention claimed is:
1. A tire changer machine comprising:
   a drive assembly configured to receive a wheel rim for rotation about an axis;
   a clamping assembly having a spindle assembly configured to releasably engage the drive assembly to secure the wheel rim to the drive assembly;

a plurality of tools selectively positionable to mount a tire on the wheel rim and demount a tire from the wheel rim;

a control system configured to coordinate operation of the plurality of tools and said clamping assembly;

a control input element configured to be selectively operable by a human operator to direct said control system to complete a tire service procedure for a wheel assembly secured by said clamping assembly;

wherein said clamping assembly includes a knob disposed at an upper axial end of said spindle assembly, said knob including a reduced diameter annular rim-receiving region extending longitudinally between said upper axial end of said spindle assembly and an upper rim-retaining annular flange; and wherein a transition surface between said reduced diameter annular rim-receiving region and said upper rim-retaining annular flange is configured as a spherical sector.

2. The tire changer machine of claim 1 wherein a transition surface between said upper axial end of said spindle assembly and said longitudinally extended reduced diameter annular region is configured as a conical surface.

3. The tire changer machine of claim 1 wherein said clamping assembly includes a clamp nut assembly coaxially secured to said spindle assembly.

4. The tire changer machine of claim 3 wherein said clamp nut assembly includes an annular body having an axial bore configured to receive said spindle assembly;

wherein said annular body further includes a set of pivoting lock pawls for releasably engaging said spindle assembly within said axial bore; and wherein said annular body further includes a set of pivoting release pawls in meshed engagement with said lock pawls, each release pawl in said set including a spring-biased extension tab extending adjacent an outer surface of said annular body, said spring-biased extension tabs configured to exert a rotational force on said lock pawls in meshed engagement with said release pawls, biasing said lock pawls into releasable engagement with said spindle assembly.

5. The tire changer machine of claim 3 wherein said spindle assembly includes a shaft body having an axial bore and an outer surface with a grooved portion longitudinally adjacent to said knob and a smooth portion longitudinally displaced from said knob, said smooth portion of said outer surface intersected by a plurality of radially directed bores arranged in sets at common axial positions along said smooth portion, and wherein within each set, said radial bores are alternately sized to pass and retain associated ball bearings;

wherein said knob includes an axial passage; and wherein a plunger assembly extends through said axial passage and is retained within said axial bore for axial movement between a lock position in which said ball bearings disposed within said retaining radial bores are displaced radially outward by said plunger to protrude from said smooth surface, and a release position in which said ball bearings rest within said bores below said smooth surface.

6. The tire changer machine of claim 5 wherein said plunger assembly includes a rod terminating at a first end at a lock-indicator extending axially outward from said axial passage of said knob, and terminating at a second end at a plunger shaft at a second axial end of the shaft body;

wherein said plunger shaft includes a set of annular races on an outer surface, each annular race associated with a set of said radially directed bores and adapted to receive said ball bearings from said associated retaining bores of said set when in axial alignment there with; and a spring disposed coaxial with said rod, said spring biasing said rod towards a locked position in which the annular races are axially displaced from the associated sets of radial bores.

7. A method for demounting a tire from a wheel assembly, implemented with a tire changer machine including a drive assembly configured to receive a wheel rim for rotation about an axis, a clamping assembly configured to engage the drive assembly to secure the wheel rim to the drive assembly, a plurality of tools selectively positionable to mount a tire on a wheel rim and demount a tire from a wheel rim, a control system configured to coordinate the tools and clamping assembly to complete a tire change procedure, and a control input element configured to be operable by said single human operator, the method comprising:

positioning a first face of said wheel rim on said drive assembly;

securing said wheel rim to said drive assembly with said clamping assembly;

in response to an operator instruction, coordinating with said control system, actuation of said plurality of tools to carry out a demount procedure to demount a tire from said wheel rim, said demount procedure disposing said demounted tire adjacent said second face of said wheel rim;

retaining said demounted tire at least partially adjacent a second face of said wheel rim axially opposite said first face by engaging a a circumferential bead lip of said demounted tire with a spherical sector transition surface between an annular recessed surface and an axially adjacent annular flange of a knob disposed at an upper axial end of said clamping assembly to await complete removal of said demounted tire from said tire changer machine by an operator.

8. The method of claim 7 wherein complete removal of said demounted tire from said tire changer machine includes displacing said circumferential bead lip of said demounted tire from said annular recessed surface and axially upward past said annular flange by sliding over said spherical sector transition surface.

9. The method of claim 7 wherein securing said wheel rim to said drive assembly includes passing a portion of said clamping assembly through an axial bore in said wheel rim to engage a locking assembly within said drive assembly, said locking assembly axially drawing said clamping assembly into secured engagement with a second face of said wheel rim, axially opposite said first face.

10. A method for operating a tire changer machine comprising:

receiving a wheel rim on a drive assembly for rotation about an axis;

engaging said drive assembly with an axial clamping assembly to secure said wheel rim to said drive assembly;

positioning at least one tool to demount a tire from said wheel rim;

coordinating operation of said at least one tool and said drive assembly to demount said tire from said wheel rim; and automatically retaining said demounted tire at said axis in proximity to an upper surface of said wheel rim by engagement of an inner bead edge of said demounted tire with an annular flange of said axial clamping assembly.

11. The method of claim 10 further including the step of manually removing said retained demounted tire from said clamping assembly by releasing said inner bead edge from said annular flange.

\* \* \* \* \*